(12) United States Patent
Meyer et al.

(10) Patent No.: US 12,252,267 B2
(45) Date of Patent: Mar. 18, 2025

(54) RESTRAINT SYSTEM UTILIZING CO-AXIAL ACTUATION

(71) Applicant: GOODRICH CORPORATION, Charlotte, NC (US)

(72) Inventors: Zachary Meyer, Jamestown, ND (US); Brandon David Lee, Wahpeton, ND (US); Wallace Harold Larson, Jamestown, ND (US); Alexander Mitchell Heyd, Jamestown, ND (US)

(73) Assignee: GOODRICH CORPORATION, Charlotte, NC (US)

( * ) Notice: Subject to any disclaimer, the term of this patent is extended or adjusted under 35 U.S.C. 154(b) by 689 days.

(21) Appl. No.: 17/528,065

(22) Filed: Nov. 16, 2021

(65) Prior Publication Data

US 2023/0150670 A1    May 18, 2023

(51) Int. Cl.
*B64D 9/00* (2006.01)
(52) U.S. Cl.
CPC .................... *B64D 9/003* (2013.01)
(58) Field of Classification Search
CPC ........................................................ B64D 9/003
See application file for complete search history.

(56) References Cited

U.S. PATENT DOCUMENTS

| | | | |
|---|---|---|---|
| 3,377,040 A | 4/1968 | Hansen | |
| 3,693,919 A | 9/1972 | Albert et al. | |
| 3,759,476 A | 9/1973 | Goodwin | |
| 3,986,460 A | 10/1976 | Voigt et al. | |
| 4,049,286 A | 9/1977 | Francis, Jr. | |
| 4,077,590 A | 3/1978 | Shorey | |
| 4,331,412 A | 5/1982 | Graf | |
| 4,349,302 A | 9/1982 | Ferguson, Jr. | |
| 4,375,932 A | 3/1983 | Albert | |
| 4,395,172 A | 7/1983 | Hoener et al. | |
| 4,457,649 A | 7/1984 | Vogg et al. | |
| 4,461,437 A | 7/1984 | Ashley et al. | |
| 4,867,622 A | 9/1989 | Brown | |
| 5,000,635 A | 3/1991 | Jensen et al. | |

(Continued)

FOREIGN PATENT DOCUMENTS

| | | |
|---|---|---|
| AU | 6712381 | 8/1981 |
| DE | 102010035099 | 2/2012 |

(Continued)

OTHER PUBLICATIONS

Wallace Harold Larson, et al., U.S. Appl. No. 17/397,813, filed Aug. 9, 2021 titled "Cargo Restraint System With Individually Retractable Restraints," 40 pages.

(Continued)

*Primary Examiner* — Steven O Douglas
(74) *Attorney, Agent, or Firm* — SNELL & WILMER L.L.P.

(57) ABSTRACT

A cargo restraint system may comprise an inner shaft and a first outer tube coaxially configured to rotate about an axis and a first restraint located about the first outer tube and configured to rotate about the axis. A second outer tube coupled to the inner shaft configured to rotate about the axis and a second restraint located about the second outer tube and configured to rotate about the axis. The first restraint and the second restraint may include a head configured to rotate about the axis and a plunger configured to translate between an engaged state and a disengaged state.

18 Claims, 17 Drawing Sheets

(56) References Cited

U.S. PATENT DOCUMENTS

| | | |
|---|---|---|
| 5,131,606 A | 7/1992 | Nordstrom |
| 5,316,242 A | 5/1994 | Eilenstein-Wiegmann et al. |
| 5,957,406 A | 9/1999 | Nelson |
| 6,051,133 A | 4/2000 | Huber |
| 6,270,300 B1 | 8/2001 | Huber |
| 6,413,029 B1 | 7/2002 | Kernkamp |
| 6,425,717 B1 | 7/2002 | Saggio |
| 6,485,238 B2 | 11/2002 | Segura |
| 6,557,800 B2 | 5/2003 | Medina |
| 6,729,818 B1 | 5/2004 | Yee et al. |
| 6,926,481 B2 | 8/2005 | Huber |
| 7,086,517 B2 | 8/2006 | Clos |
| 7,344,013 B2 | 3/2008 | Krueger |
| 7,731,460 B2 | 6/2010 | Brown |
| 8,066,458 B2 | 11/2011 | Schulze et al. |
| 8,066,459 B2 | 11/2011 | Schulze et al. |
| 8,118,524 B2 | 2/2012 | Schulze et al. |
| 8,256,602 B2 | 9/2012 | Huber et al. |
| 8,585,334 B2 | 11/2013 | Moradians |
| 8,821,088 B2 | 9/2014 | Roberts |
| 8,926,243 B2 | 1/2015 | Schulze |
| 8,936,419 B1 | 1/2015 | Islam |
| 9,242,730 B2 | 1/2016 | Larson et al. |
| 9,447,618 B2 | 9/2016 | Albers et al. |
| 9,932,113 B1 | 4/2018 | Larson |
| 10,017,251 B2 | 7/2018 | Rowles et al. |
| 10,106,239 B2 | 10/2018 | Woodland |
| 10,118,700 B2 | 11/2018 | Kuppan |
| 10,293,939 B2 | 5/2019 | Conejero Moreno |
| 11,072,425 B2 | 7/2021 | Shivalinga et al. |
| 2004/0265085 A1 | 12/2004 | Mayer |
| 2007/0086870 A1 | 4/2007 | Schulze |
| 2007/0086871 A1 | 4/2007 | Brekken et al. |
| 2007/0237598 A1 | 10/2007 | Schulze |
| 2007/0253790 A1 | 11/2007 | Boggenstall |
| 2008/0310944 A1 | 12/2008 | Stegmiller |
| 2010/0143063 A1 | 6/2010 | Dugic |
| 2010/0196116 A1 | 8/2010 | Hudson et al. |
| 2011/0150594 A1 | 6/2011 | Schulze |
| 2012/0037753 A1 | 2/2012 | Huber et al. |
| 2013/0334367 A1 | 12/2013 | Larson |
| 2016/0001870 A1 | 1/2016 | Moradians et al. |
| 2016/0194082 A1 | 7/2016 | Himmelmann |
| 2017/0197717 A1 | 7/2017 | Trisotto |
| 2018/0222586 A1 | 8/2018 | Shivalinga |
| 2018/0273177 A1 | 9/2018 | Jayaprakash |
| 2019/0061945 A1 | 2/2019 | Quixano Mendez |
| 2019/0210728 A1 | 7/2019 | Pfau et al. |
| 2021/0214083 A1 | 7/2021 | Larson et al. |

FOREIGN PATENT DOCUMENTS

| | | |
|---|---|---|
| EP | 0881144 | 12/1998 |
| EP | 3508422 | 7/2019 |
| FR | 2918640 | 1/2009 |
| FR | 2918641 | 1/2009 |
| GB | 2436715 | 10/2007 |
| WO | 2004054876 | 7/2004 |

OTHER PUBLICATIONS

USPTO, Notice of Allowance dated Feb. 7, 2022 in U.S. Appl. No. 16/539,782.
USPTO, Supplemental Notice of Allowance dated Feb. 24, 2022 in U.S. Appl. No. 16/539,782.
European Patent Office, European Partial Search Report dated Mar. 20, 2023 in Application No. 22206500.5.
European Patent Office, European Partial Search Report dated Jun. 21, 2023 in Application No. 22206500.5.
European Patent Office, European Office Action dated Sep. 27, 2023 in Application No. 19213585.3.
European Patent Office, European Search Report dated Apr. 29, 2019 in Application No. 19150916.5.
USPTO, Non-Final Office Action dated Jun. 27, 2019 in U.S. Appl. No. 15/866,241.
USPTO, Notice of Allowance dated Dec. 17, 2019 in U.S. Appl. No. 15/866,241.
European Patent Office, European Search Report dated Jun. 26, 2020 in Application No. 19213585.3.
European Patent Office, European Search Report dated Jul. 10, 2020 in Application No. 19214487.1.
European Patent Office, European Search Report dated Jul. 21, 2020 in Application No. 19216272.5.
USPTO, Pre-Interview First Office Action dated Sep. 30, 2020 in U.S. Appl. No. 16/539,203.
USPTO, Pre-Interview First Office Action dated Sep. 30, 2020 in U.S. Appl. No. 16/539,224.
USPTO, Notice of Allowance dated Nov. 20, 2020 in U.S. Appl. No. 16/539,203.
USPTO, Notice of Allowance dated Nov. 23, 2020 in U.S. Appl. No. 16/539,224.
USPTO, Restriction/Election Requirement dated May 17, 2021 in U.S. Appl. No. 16/539,782.
USPTO, Non-Final Office Action dated Oct. 1, 2021 in U.S. Appl. No. 16/539,782.
European Patent Office, European Office Action dated Mar. 17, 2022 in Application No. 19214487.1.
European Patent Office, European Office Action dated Aug. 8, 2022 in Application No. 19213585.3.
European Patent Office, European Search Report dated Dec. 14, 2022 in Application No. 22186546.2.
USPTO; Notice of Allowance dated Nov. 6, 2024 in U.S. Appl. No. 17/397,813.

RESTRAINT SYSTEM UTILIZING CO-AXIAL ACTUATION

FIELD

The present disclosure is directed to cargo restraint systems and, more particularly, to a cargo restraint system capable of coaxial actuation of restraints.

BACKGROUND

Many aircraft have at least one cargo bay designed to receive cargo. Such cargo bays include cargo loading systems that include rollers located on a floor of the cargo bay to provide conveyance for moving a unit load device (ULD) or other cargo through the cargo bay. After cargo has been loaded into the cargo bay, it may be desirable to restrain the cargo. Some ULDs, for example, military pallets, have pockets along the sides of the pallets. Restraints may be located in the pockets to provide longitudinal and/or lateral restraint. Such restraint reduces the likelihood of cargo shifting relative to the cargo bay during taxi, takeoff, flight, and landing. Current restraint actuation systems are generally configured to deploy and to stow all the restraints simultaneously. Such actuating scheme tends to limit the number of available cargo load configurations.

SUMMARY

In various embodiments, a restraint assembly actuation system for use with a cargo restraint system is provided comprising a drive shaft assembly comprising a first outer tube and an inner shaft, wherein the first outer tube and the inner shaft are disposed coaxially about an axis and a first restraint coupled to the first outer tube, wherein the first outer tube is configured to rotate the first restraint about the axis to a raised position to restrain a cargo load.

In various embodiments, the first restraint comprises a head configured to engage with the cargo load.

In various embodiments, the first restraint comprises a shroud coupled to the outside of the first outer tube, and a plunger rod coupled to the shroud and the head.

In various embodiments, the shroud comprises a notch opening configured to receive a notch coupled to the inner shaft and the shroud at a first opening of the first outer tube.

In various embodiments, the first restraint further comprises the head defining a plunger channel, a plunger including the plunger rod and a plunger lever, the plunger rod being located, at least, partially in the plunger channel, a plunger torsion spring configured to apply a first biasing load to the plunger lever, and a compression spring configured to bias a first end of the plunger away from an upper surface of the head. In various embodiments, a drive cap located around the first end of the plunger rod. In various embodiments, the shroud defines a plunger opening configured to receive the first end of the plunger rod. In various embodiments, the shroud includes a protrusion extending radially outward from an outer circumferential surface of the shroud. In various embodiments, a second outer tube is coupled to the inner shaft and configured to rotate with the inner shaft. In various embodiments, a second restraint is coupled to the second outer tube, wherein the second outer tube is configured to rotate the second restraint about the axis to a raised position to restrain the cargo load. In various embodiments, the second outer tube is located aft of the first outer tube.

In various embodiments, a coaxial actuator assembly is provided comprising a drive shaft assembly comprising a first outer tube and an inner shaft, wherein the first outer tube and the inner shaft are disposed coaxially about an axis, a first outer tube actuator assembly coupled to the drive shaft assembly, a first actuator tube disposed within the first outer tube actuator assembly and coupled to the first outer tube, wherein the first actuator tube comprises a first actuator opening and a second actuator opening, each disposed in the first actuator tube, a first spring loaded plunger configured to be disposed in at least one of the first actuator opening or the second actuator opening, and a first actuator lever coupled to the first spring loaded plunger, the first actuator lever configured to translate the first spring loaded plunger at least one of in and out the first actuator opening and the second actuator opening, and a first geometric gripping surface coupled to the first outer tube actuator assembly configured to drive rotation of the first outer tube. In various embodiments, the first outer tube rotates coaxially about the axis in response to the first geometric gripping surface driving rotation of the first outer tube. In various embodiments, an inner shaft actuator assembly is coupled to the drive shaft assembly, a second actuator tube disposed within the inner shaft actuator assembly and coupled to the inner shaft, wherein the second actuator tube comprises a first actuator opening and a second actuator opening each disposed in the second actuator tube, a second spring loaded plunger configured to be disposed in the first actuator opening or the second actuator opening, and a second actuator lever coupled to the second plunger, configured to translate the second plunger at least one of in and out the first actuator opening and the second actuator opening, and a second geometric gripping surface coupled to the inner shaft actuator assembly and configured to drive rotation of the inner shaft. In various embodiments, the inner shaft rotates in response to the second geometric gripping surface driving rotation of the inner shaft.

In various embodiments, a restraint assembly actuation system is provided comprising a drive shaft assembly comprising a first outer tube and an inner shaft, wherein the first outer tube and the inner shaft are disposed coaxially about an axis, a coaxial actuator assembly comprising a first outer tube actuator assembly coupled to the drive shaft assembly, a first actuator tube disposed within the first outer tube actuator assembly and coupled to the first outer tube, wherein the first actuator tube comprises a first actuator opening and a second actuator opening each disposed in the first actuator tube, a first spring loaded plunger configured to be disposed in at least one of the first actuator opening or the second actuator opening, a first actuator lever coupled to the first spring loaded plunger, configured to translate the first spring loaded plunger at least one of in and out the first actuator opening and the second actuator opening, and a first geometric gripping surface coupled to the first outer tube actuator assembly and configured to drive rotation of the first outer tube, a second outer tube coupled to the inner shaft, and a first restraint assembly actuation system comprising a first restraint coupled to the first outer tube, wherein the first outer tube is configured to rotate the first restraint about the axis to a raised position to restrain a cargo load. In various embodiments, a second restraint is coupled to the second outer tube. In various embodiments, the second outer tube is configured to rotate the second restraint about the axis to the raised position to restrain the cargo load. In various embodiments, an inner shaft actuator assembly is coupled to the drive shaft assembly, a second actuator tube disposed within the inner shaft actuator assembly and coupled to the inner shaft, wherein the second actuator tube comprises a first actuator opening and a second actuator opening each disposed in the second actuator tube, a second spring loaded plunger configured to be disposed within at least one of the first actuator opening or the second actuator opening, and a second actuator lever coupled to the second plunger, configured to translate the second plunger at least one of in and out the first actuator opening and the second actuator opening, and a second geometric gripping surface coupled to the inner shaft actuator assembly configured to drive rotation of the inner shaft. In various embodiments, a plurality of forward restraints is coupled to the first outer tube and configured to be actuated by the first outer tube, and a plurality of aft restraints coupled to the second outer tube and configured to rotate coaxially with the second outer tube.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

Figure 1:
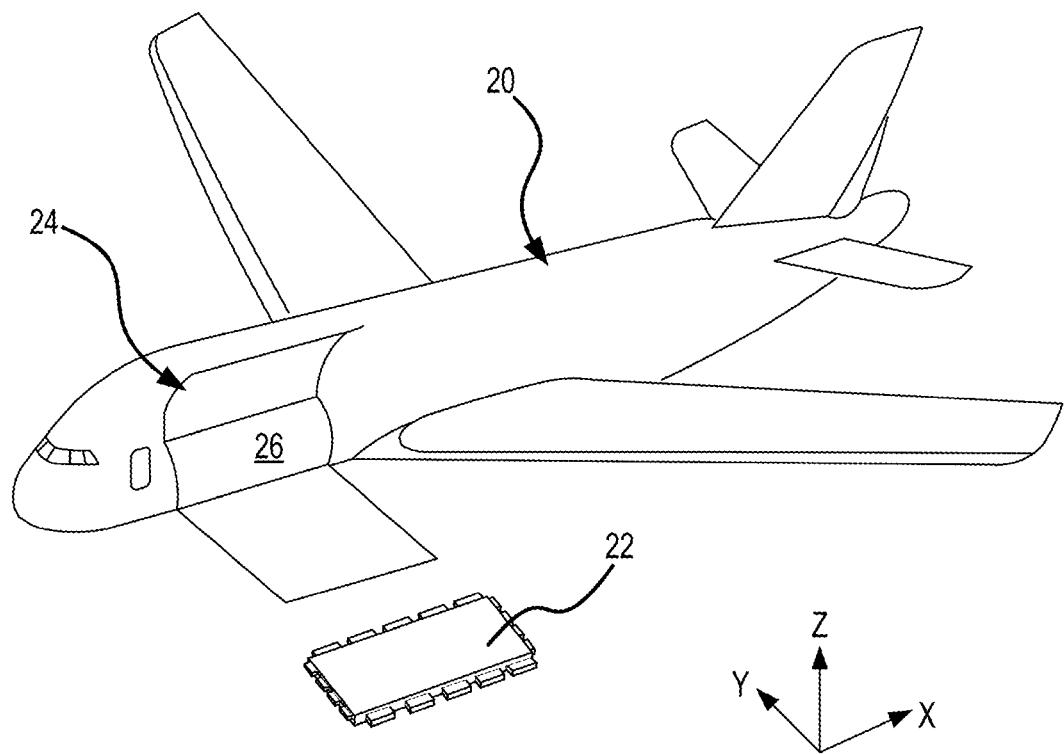
FIG. 1 illustrates an aircraft being loaded with cargo, in accordance with various embodiments.

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

The present disclosure provides a restraint assembly actuation system for aircraft cargo that, in various embodiments, utilizes a coaxial actuator assembly to actuate (e.g., using any appropriate motion or combination of motions) one or more restraints from a raised (or deployed) position to a stowed position. In accordance with various embodiments, the restraint assembly actuation system includes a drive shaft assembly comprising a first outer tube and an inner shaft disposed coaxially about an axis. In various embodiments, the inner shaft can be another tube and not a solid shaft. Multiple tubes may be disposed in the system coaxially about the axis without a solid inner shaft. In various embodiments, a first restraint or a plurality of first restraints may be coupled to a first outer tube. The cargo restraint system, in various embodiments, also comprises one or more coaxial actuator assemblies. A coaxial actuator assembly, in various embodiments, comprises a first outer tube actuator assembly coupled to the drive shaft assembly. The first outer tube actuator assembly, in various embodiments, controls rotation of the first outer tube located about the axis. Translation of the first restraint or a plurality of first restraints may be controlled by rotation of the first outer tube.

In accordance with various embodiments, a coaxial actuation assembly may comprise an inner shaft actuator assembly configured to control rotation of the inner shaft. At or near an aft end of the inner shaft, in various embodiments, an extender tube may be coupled to the inner shaft. A second outer tube may be coupled to the inner shaft at the extender tube, such that rotation of the inner shaft is translated to the second outer tube. Translation of a second restraint or a plurality of second restraints may be controlled by rotation (e.g., actuation) of the second outer tube. Allowing the restraints to be actuated as in at least two groups allows for more flexible control options than a single actuation system that actuates all restraints at once, while increasing the number of available restraining configurations throughout the cargo deck.

Figure 2:
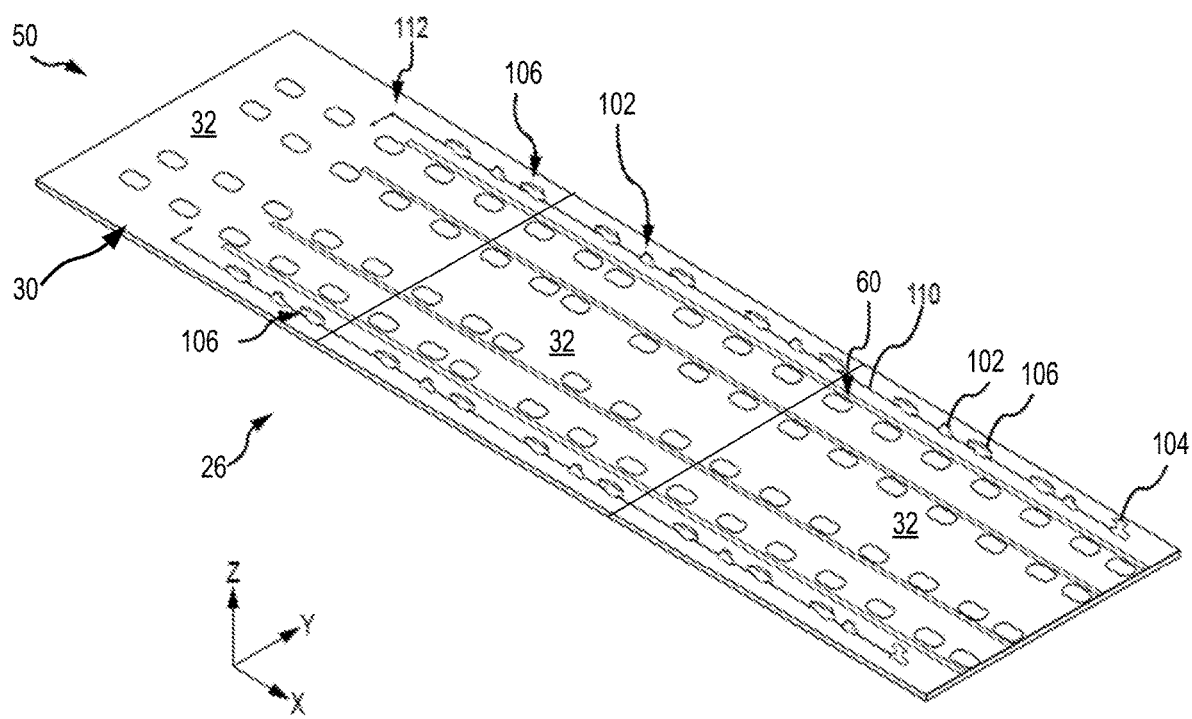
FIG. 2 illustrates a portion of an aircraft cargo deck having a cargo restraint system, in accordance with various embodiments.

FIG. 1 illustrates an aircraft 20 with cargo 22 being loadable through a loading door 24 of the aircraft 20. Cargo 22 may be loaded through loading door 24 and onto a cargo deck 26. FIG. 2 illustrates cargo deck 26. An X-Y-Z axis is shown in various drawings to illustrate various orientations of components. Cargo deck 26 includes a cargo deck floor 30, which may be formed by one or more panels 32 that are coupled to various structural components of aircraft 20 (e.g., to beams, floors, etc.).

In accordance with various embodiments, FIG. 2 illustrates cargo deck 26 includes a restraint assembly actuation system 50. Stated differently, restraint assembly actuation system 50 may be installed along cargo deck 26. Cargo deck 26 may also include a cargo loading system 60 comprising a plurality of freely rotating conveyance rollers and/or powder drive units (PDUs) mounted in the cargo deck 26 to define the conveyance plane. Cargo loaded onto the aircraft cargo deck 26 can be moved throughout the cargo deck 26 using the cargo loading system 60.

Restraint assembly actuation system 50 may be used to restrain cargo (e.g., unit load devices (ULDs)) within/relative to the cargo deck 26. The restraint assembly actuation system 50 may include a plurality of first restraints 102a, one or more second restraints 104, and a plurality of third restraints 106. In various embodiments, the first restraints 102 may be referred to as X-restraints as they may restrict cargo from translating in the X (or longitudinal) direction. The second restraints 104 may be referred to as Z-restraints as they may restrict cargo from translating in the Z (e.g., vertical) direction. The third restraints 106 may be referred to as YZ-restraints as they may restrict translation of cargo in the Z (e.g., vertical) direction and the Y (e.g., lateral) direction. However, one skilled in the art will realize that the restraints 102, 104, 106 may be used to restrain cargo in any other directions (e.g., the first restraints 102 may restrain cargo in the Y direction). The restraint assembly actuation system 50 may include a coaxial actuator assembly 110. A control region 112 of coaxial actuator assembly 110 may be located, for example, proximate loading door 24, a forward end of the aircraft, and/or at any other location that may be readily accessible to crew responsible for loading cargo into cargo deck 26. As described in further detail below, various components of coaxial actuator assembly 110 may be located under panels 32. Coaxial actuator assembly 110 is configured to control the actuation of the first restraints 102. In this regard, coaxial actuator assembly 110 may be employed to translate first restraints 102 between a raised position and a stowed position. In various embodiments, coaxial actuator assembly 110 may also control actuation of the second restraints 104 and/or the third restraints 106.

Figure 3:
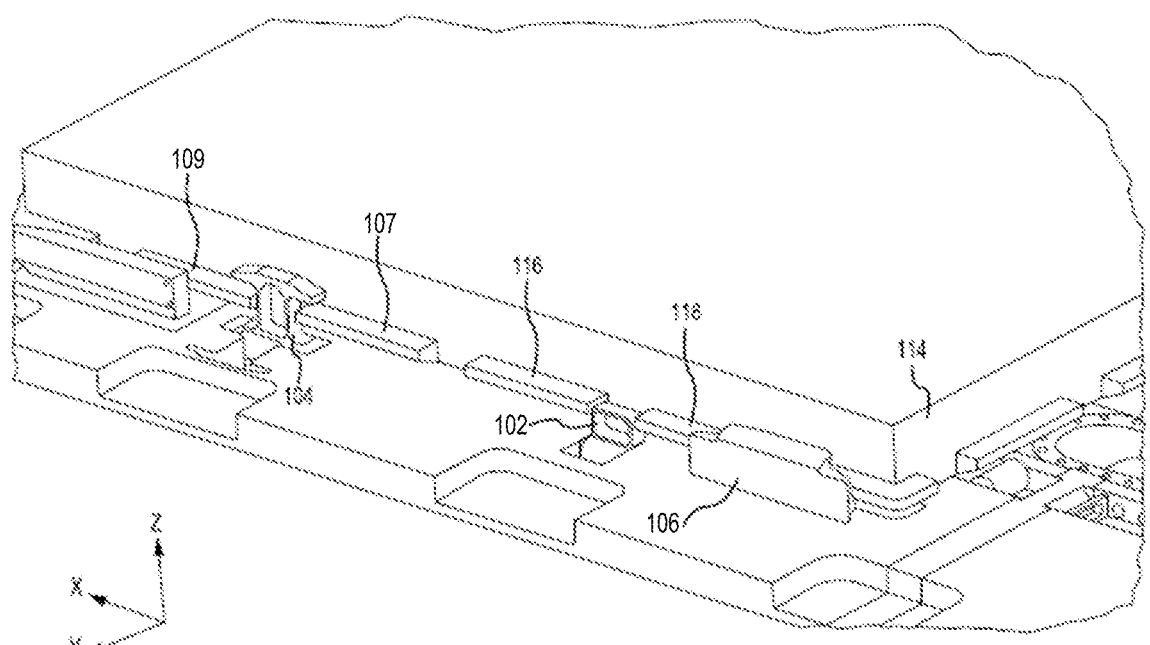
FIG. 3 illustrates a portion of the cargo restraint system of FIG. 2, in accordance with various embodiments.

FIG. 3 illustrates how the various restraints of restraint assembly actuation system 50 may restrain a ULD 114. As shown, the first restraint 102 may rest between tabs 116, 118 of the ULD 114, restricting movement of the ULD 114 in the X direction. The second restraint 104 may rest above tabs 107, 109 of the ULD 114, thus restricting movement of the ULD 114 in the Z direction. The third restraint 106 may rest adjacent and above the tab 118 of the ULD 114, thus restricting movement of the ULD 114 in the Y and Z directions.

Figure 4A:
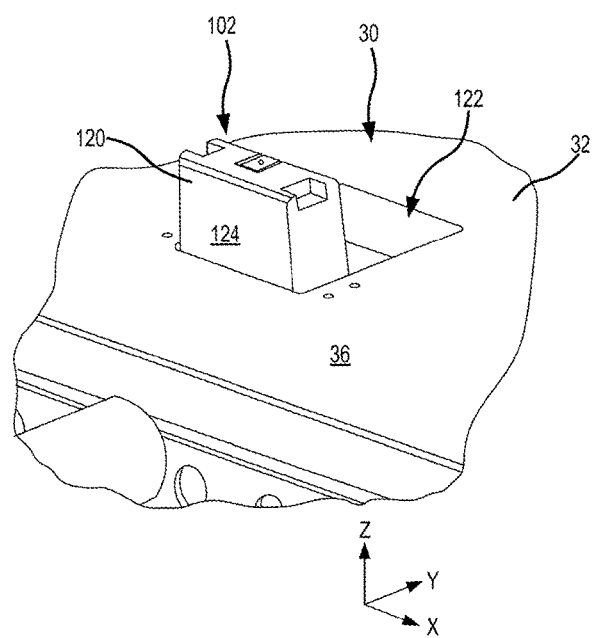
FIGS. 4A and 4B illustrate a first restraint of a restraint assembly actuation system for use with the cargo restraint system of FIG. 2, in a raised position and a stowed position, respectively, in accordance with various embodiments.
Figure 4B:
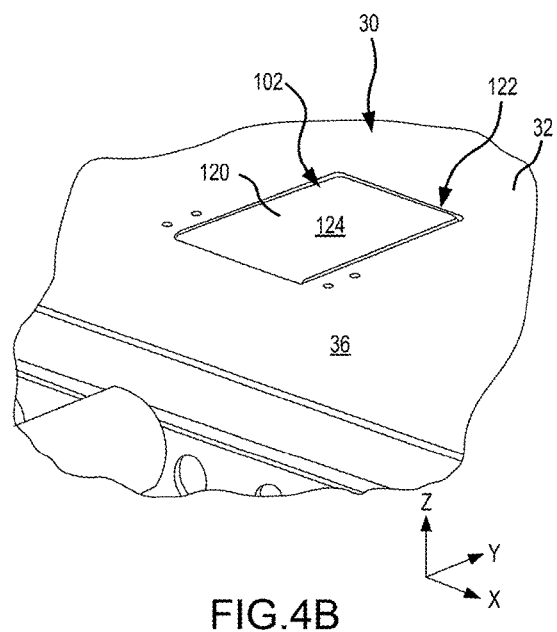

Referring now to FIG. 4A and FIG. 4B, additional details of a first restraint 102 are shown. As shown, first restraint 102 may be actuated between a raised position (as shown in FIG. 4A) and a stowed position (as shown in FIG. 4B). First restraint 102 may include a head 120 (also referred to herein as a restraint body) which may be both raised and stowed. In the raised position, the head 120 may extend above the cargo deck floor 30. In the stowed position, the head 120 may fit within an orifice 122 formed in the cargo deck floor 30. For example, panel 32 may define an orifice 122 configured to receive a head 120. In the stowed position, a first surface 124 of head 120 may be relatively/substantially flush and/or planar with an upper surface 36 the panel 32.

Figure 12:
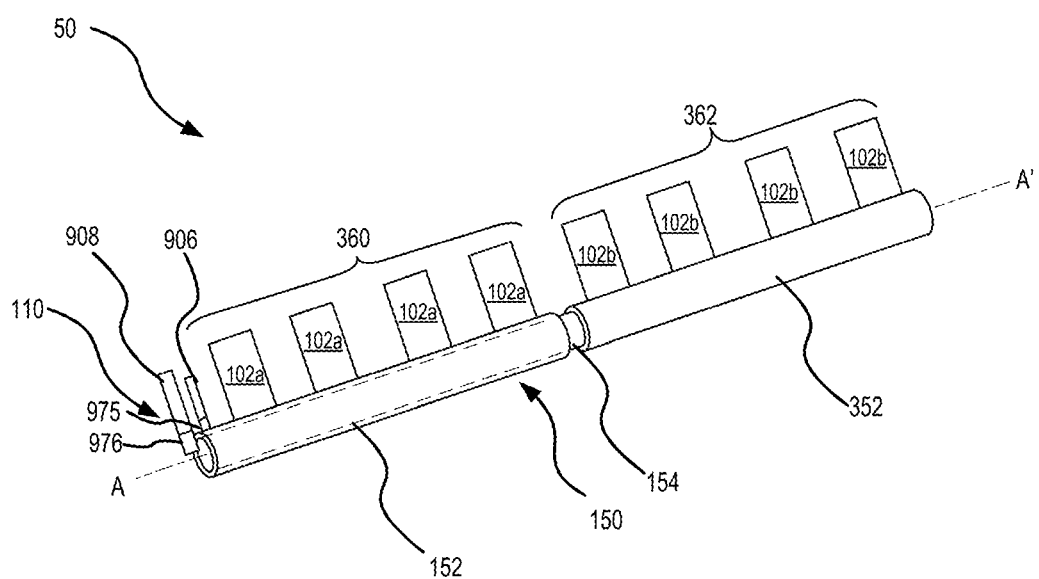
FIG. 12 illustrates a restraint assembly actuation system, in accordance with various embodiments.

With momentary reference to FIG. 12, restraint assembly actuation system 50 is further illustrated. Restraint assembly actuation system 50 comprises first group 360 of restraints 102a and second group 362 of restraints 102b. Restraint assembly actuation system 50 further comprises drive shaft assembly 150. Drive shaft assembly 150 comprises inner shaft 154 and first outer tube 152, which are coaxially disposed as described herein along axis A-A', with A representing the forward terminus of drive shaft assembly 150 and A' representing the aft terminus of drive shaft assembly 150. Coaxial actuator assembly 110 is illustrated comprising inner shaft actuator assembly 976 and first outer tube actuator assembly 975. Inner shaft 154 is coupled to inner shaft actuator assembly 976, where inner shaft actuator assembly 976 is configured to rotate inner shaft 154 about axis A-A'. First outer tube 152 is coupled to first outer tube actuator assembly 975, where first outer tube actuator assembly 975 is configured to rotate first outer tube 152 about axis A-A'.

First outer tube 152 is configured, as shown and described herein, to actuate restraints 102a. In that regard, rotation of first outer tube 152 imparted by first outer tube actuator assembly 975 causes actuation of restraints 102a. Restraints 102b, however, remain stationary and are thus not activated by rotation of first outer tube 152 imparted by first outer tube actuator assembly 975. Rotation of inner shaft 154 imparted by inner shaft actuator assembly 976 causes actuation of restraints 102b. In that manner, first group 360 are separately actuated from second group 362. Stated another way, restraint assembly actuation system 50 allows one group of restraints to be actuated independently of a second group of restraints.

In various embodiments, first outer tube 152 terminates along axis A-A'. Inner shaft 154 may be coupled to second outer tube 352. Second outer tube 352 may be fixedly attached to inner shaft 154 such that rotation of inner shaft 154 rotates second outer tube 352. In that regard, in various embodiments, inner shaft 154 rotates an extender tube such that second outer tube 352 rotates one revolution for every one revolution rotated by inner shaft 154. Second outer tube 352 may be fixedly attached to inner shaft 154 by any suitable means, for example, by press fit, interference fit, fasteners, threaded engagement, radially disposed pins, and/or welding, brazing, or other metallurgical joinery. Second outer tube 352 may be coupled to inner shaft 154 via intermediary components, such as a collar or cylindrical clamp.

Figure 5A:
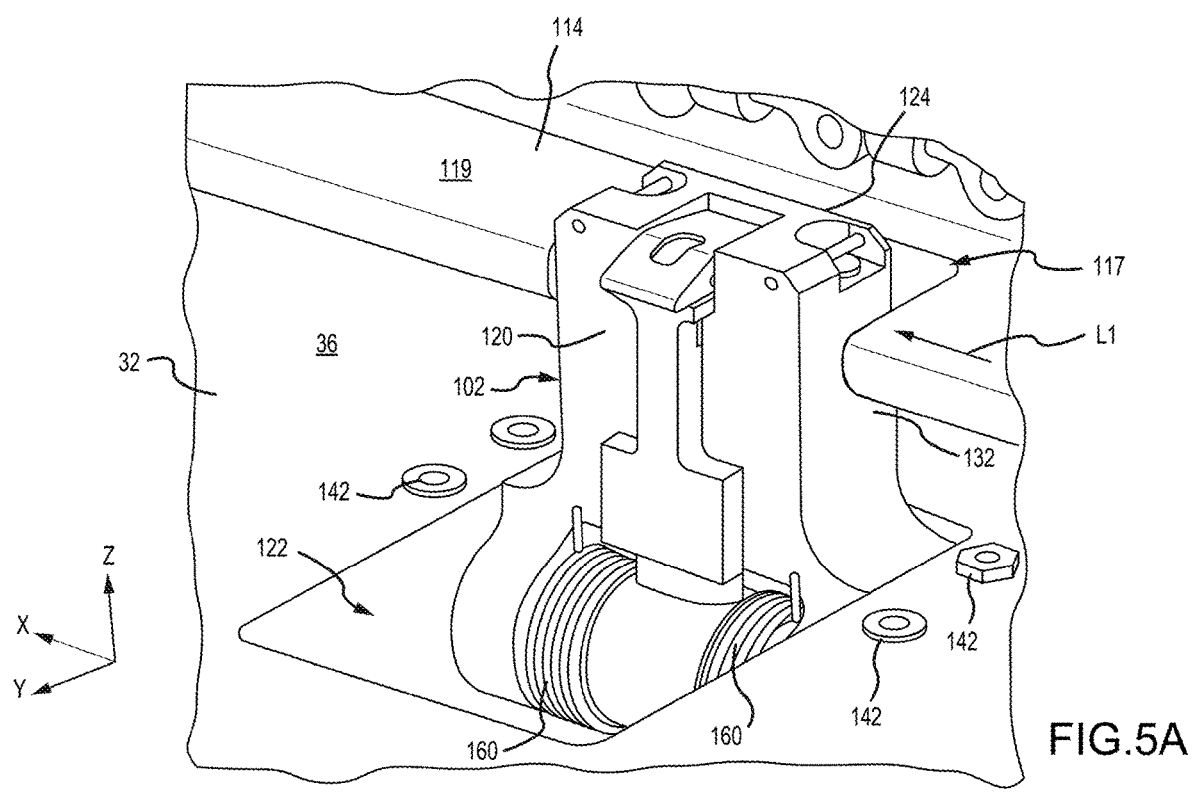
FIGS. 5A and 5B illustrate the first restraint of the restraint assembly actuation system for use with the cargo restraint system of FIG. 2, in the raised position, in accordance with various embodiments.
Figure 5B:
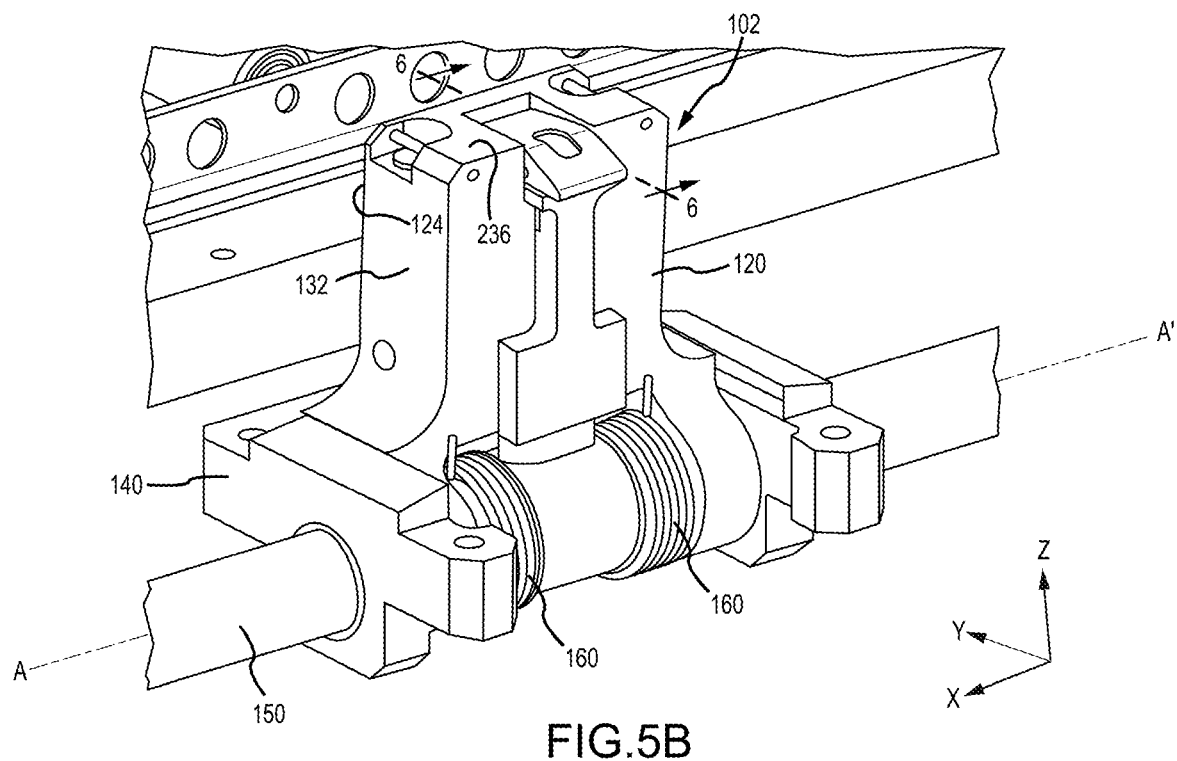

With reference to FIG. 5A and FIG. 5B, first restraint 102 is illustrated in the raised position. In FIG. 5B, panel 32 is removed to illustrate components of restraint assembly actuation system 50 that may be located under upper surface 36 of panel 32. In various embodiments, first restraint 102 may include one or more roller(s). Rollers may protrude from side surfaces 132 of head 120. Rollers may be spring loaded such that rollers retract into head 120, against the bias of a spring, in response to a load (represented by arrow L1) being transmitted from ULD 114 into the roller and consequently first restraint 102. First restraint 102 may be raised into (e.g., located within) a pocket 117 of ULD 114. Pocket 117 may be defined by a flange 119 located about a perimeter of ULD 114. In embodiments, load L1 may be transmitted from ULD 114 into first restraint 102. The rollers may reduce friction between ULD 114 and first restraint 102 when first restraint 102 translates between the raised position (as shown in FIG. 4A and FIG. 5A) and the stowed position (as shown in FIG. 4B). In this manner, first restraint 102 may allow for lower release forces when moving from the raised position to the stowed position to release ULD 114. Stated differently, forces reacting between ULD 114 and first restraint 102 are attenuated by the rollers to increase ease of movement of first restraint 102 (relative to ULD 114) when moving between the raised position and the stowed position.

A mount 140 (FIG. 5B) may be coupled to panel 32 via fasteners 142. Fasteners 142 can be washers and a bolt head, or any other suitable fastener. In accordance with various embodiments, a drive shaft assembly 150 may be located through, and may extend through, mount 140 and head 120. Stated differently, mount 140 and head 120 may be located on, and/or mounted on, drive shaft assembly 150. Mount 140 may be a stationary structure. Head 120 and drive shaft assembly 150 may rotate relative to mount 140. Drive shaft assembly 150 includes a first outer tube 152 and an inner shaft 154. First outer tube 152 is located about inner shaft 154 (e.g., first outer tube 152 and inner shaft 154 are coaxially disposed). In accordance with various embodiments, first outer tube 152 and inner shaft 154 may both coaxially rotate about an axis A-A'. However, first outer tube 152 rotates independently of inner shaft 154. In this regard, rotation of inner shaft 154 may be performed independently from first outer tube 152 (i.e., rotation of inner shaft 154 does not cause or impart rotation/movement of first outer tube 152) and rotation of first outer tube 152 may be performed independently from inner shaft 154 (i.e., rotation of first outer tube 152 does not cause or impart rotation/movement of inner shaft 154).

In various embodiments, a lubricant may be applied to the outside of the inner shaft to reduce friction between the first outer tube and the inner shaft. The lubricant may comprise oil or grease. In various embodiments, the outside of the inner shaft or the inside of the first outer tube may be coated in polytetrafluoroethylene to reduce friction between the first outer tube and the inner shaft. In various embodiments, the inner shaft and/or the first outer tube may comprise a wear coating disposed on one or more surfaces to provide corrosion resistance and/or mitigation of friction or abrasion.

First restraint 102 may include one or more head torsion spring(s) 160. Head torsion spring 160 is configured to bias head 120 toward the raised position or the stowed position. Stated differently, head torsion spring 160 is configured to bias head 120 in a first circumferential direction about axis A-A'. As described in further detail below, first restraint 102 includes a plunger 170 (FIG. 6), which may engage first outer tube 152, such that rotation of first outer tube 152 is transferred to head 120. Stated differently, when the plunger 170 is in an engaged state, head 120 rotates with first outer tube 152.

Figure 6:
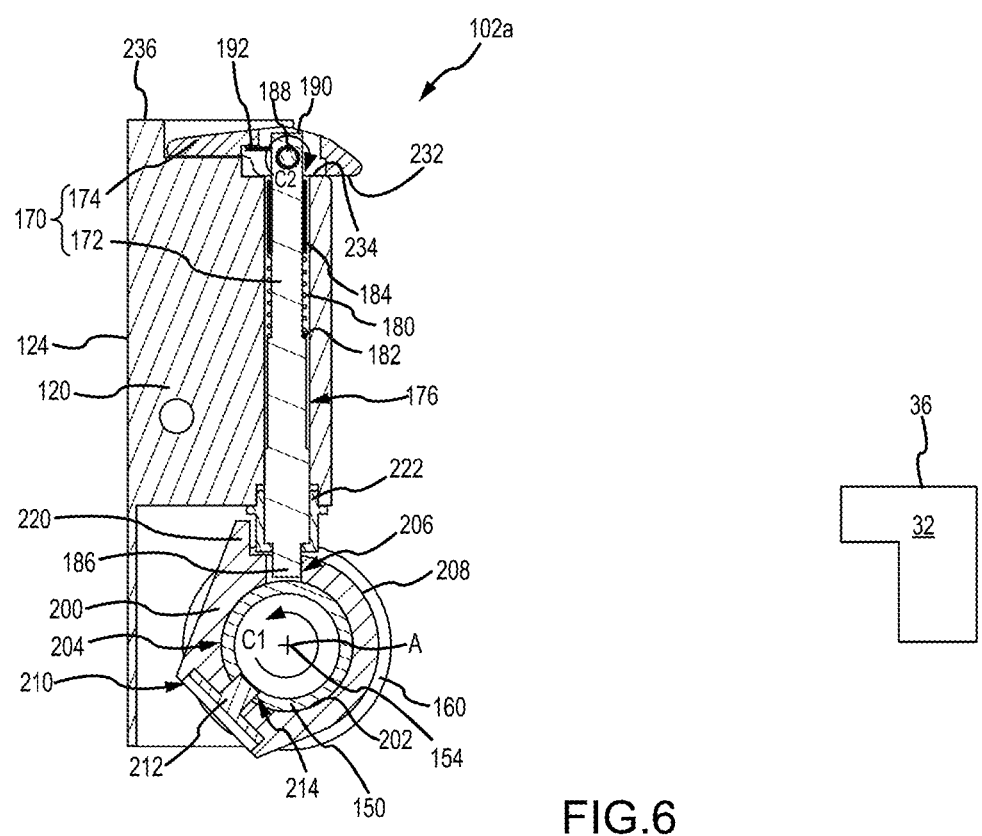
FIG. 6 illustrates a cross-section view of the first restraint of the restraint assembly actuation system for use with the cargo restraint system of FIG. 2, in the raised position, with the cross-section taken along the line 6-6 in FIG. 5B.

With reference to FIG. 6, a cross-section view of first restraint 102, taken along line 6-6 in FIG. 5B, is illustrated. In accordance with various embodiments, first restraint 102a includes a plunger 170. In FIG. 6, first restraint 102 is in the raised position and plunger 170 is in an engaged state. Plunger 170 includes a plunger rod 172 and a plunger lever 174. Plunger rod 172 is configured to translate radially (i.e., perpendicular to axis A-A'). In this regard, plunger rod 172 translates toward and away from first outer tube 152. In various embodiments, plunger rod 172 may located in a plunger channel 176 defined by head 120. A compression spring 180 may be located about plunger rod 172. Compression spring 180 may be compressed between a spring interference surface 182 of plunger rod 172 and a bushing 184 located about plunger rod 172. In various embodiments, bushing 184 may be eliminated and compression spring 180 may be compressed between spring interference surface 182 of plunger rod 172 and a second spring interference formed by head 120. Compression spring 180 biases a first end 186 of plunger rod in the radially inward direction (i.e., toward first outer tube 152 and axis A-A).

A pin 188 may be located through plunger rod 172 and plunger lever 174. Pin 188 may be located proximate a second end 190 of plunger rod 172. Second end 190 is opposite first end 186. Plunger lever 174 may rotate about pin 188. A plunger torsion spring 192 may be located about pin 188 and may apply a biasing load to plunger lever 174. Plunger torsion spring 192 may bias plunger lever 174 in the first circumferential direction about pin 188.

In accordance with various embodiments, a shroud 200 may be located about first outer tube 152. Stated differently, an inner circumferential surface 202 of shroud 200 may define a tube channel configured to receive first outer tube 152. In accordance with various embodiments, a plunger opening 206 is formed in the outer circumferential surface 208 of shroud 200. Stated differently, shroud 200 defines plunger opening 206. Plunger opening 206 is configured to receive first end 186 of plunger rod 172. Locating plunger rod 172 in plunger opening 206 creates an interference between plunger rod 172 and shroud 200, such that plunger rod 172 is prevented from translating relative to shroud 200. In accordance with various embodiments, shroud 200 defines a notch opening (e.g., a bore) 210 configured to receive a notch 212. First outer tube 152 may define a notch channel 214. Notch 212 may be located through notch opening 210 and in notch channel 214, in response to radially aligning notch opening 210 and notch channel 214. Locating notch 212 in notch opening 210 and notch channel 214 rotationally couples shroud 200 and first outer tube 152, such that rotation of first outer tube 152 about axis A-A' causes shroud 200 to rotate about axis A-A'. Inner shaft 154 is shown extending through axis A-A', axis A-A' being the common axis for both first outer tube 152 and inner shaft 154.

Shroud 200 includes a protrusion 220. Protrusion 220 extends radially outward from outer circumferential surface 208 of shroud 200. A drive cap 222 may be located around first end 186 of plunger rod 172, and between plunger rod 172 and head 120. When plunger 170 is an engaged state (i.e., when plunger rod 172 is in plunger opening 206), protrusion 220 may be located proximate and/or may abut drive cap 222. When plunger 170 is the engaged state, rotation of first outer tube 152 about axis A-A' causes shroud 200 to rotate in the same direction about axis A-A' as first outer tube 152 due to the contact between notch 212 and first outer tube 152 and the contact between notch 212 and shroud 200. The rotation of shroud 200 causes head 120 to rotate in the same direction about axis A-A' as first outer tube 152 due to the contact between protrusion 220 and drive cap 222. In this regard, a rotational force is transferred from shroud 200 to head 120 via contact between protrusion 220 and drive cap 222.

When plunger rod 172 is radially aligned with plunger opening 206, compression spring 180 forces first end 186 of plunger rod 172 into plunger opening 206 (i.e., plunger is forced into the engaged state). When plunger rod 172 is located in plunger opening 206, the location of second end 190 and pin 188 generate an interference between a first lever surface 232 of plunger lever 174 and a first lever interference surface 234 of head 120. In accordance with various embodiments, plunger torsion spring 192 is configured to bias first lever surface 232 toward first lever interference surface 234. The interference (e.g., contact) between first lever surface 232 and first lever interference surface 234 blocks, or prevents, further rotation of plunger lever 174 in the first circumferential direction about 188 (i.e., the inference overcomes the biasing load being applied by plunger torsion spring 192). In the engaged state, plunger lever 174 may be located radially inward of an upper surface 236 of head 120. In this regard, a distance plunger lever 174 and axis A-A' may be less than a distance between upper surface 236 and axis A-A'. Upper surface 236 may be approximately perpendicular to first surface 124 and side surfaces 132 (FIG. 5B). As used in the previous context only, "approximately" means±15° from perpendicular. In accordance with various embodiments, the spring constant of compression spring 180 is great enough to overcome the biasing load applied by plunger torsion spring 192.

Figure 7A:
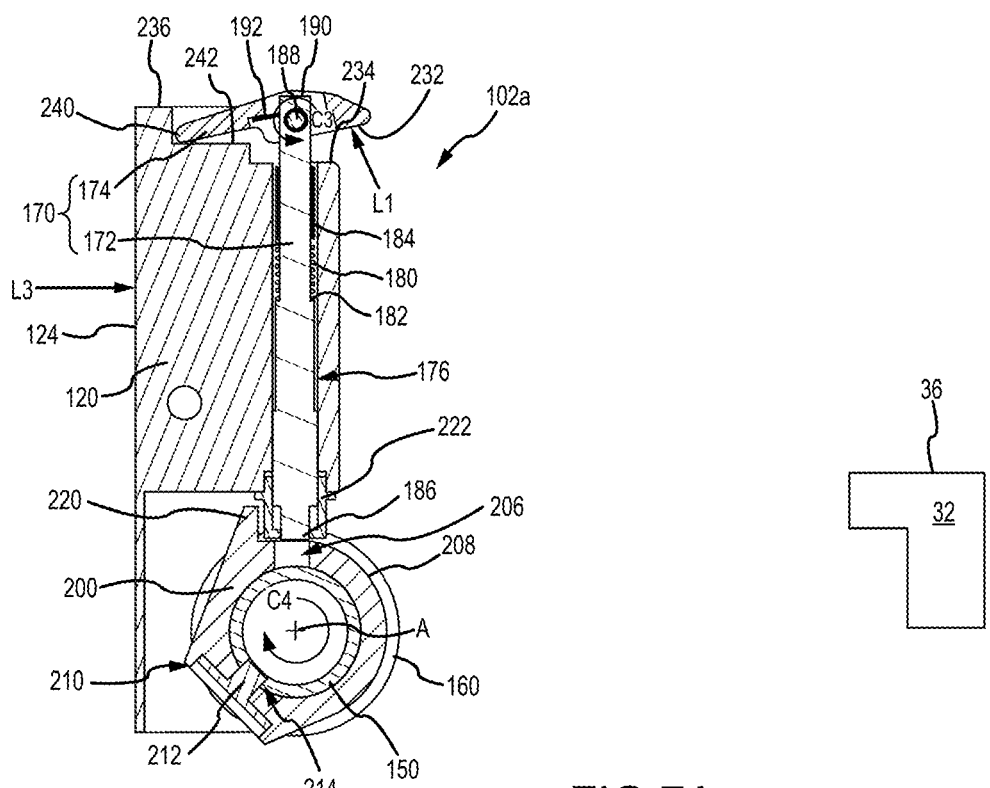
FIGS. 7A, 7B, 7C, 7D and 7E illustrate a cross-section view of the first restraint of the restraint assembly actuation system for use with the cargo restraint system of FIG. 2, taken along the line 6-6 in FIG. 5B as the first restraint translates from the raised position to the stowed position, in accordance with various embodiments.

With reference to FIG. 7A, a cross-section view of first restraint 102, taken along line 6-6 in FIG. 5B, is illustrated, with first restraint 102 in the raised position and plunger 170 in a disengaged state. To translate plunger 170 from the engaged state (FIG. 6) to the disengaged state (FIG. 7A), a load L2 is applied in a second circumferential about pin 188 (e.g., in a direction opposite the biasing force applied by plunger torsion spring 192). The load L2, along with an interference between a first end 240 of plunger lever 174 and a second lever interference surface 242 of head 120, force pin 188, second end 190 of plunger rod 172, and first lever surface 232 away from first lever interference surface 234 of head 120. The translation of plunger rod 172 away from axis A-A' causes first end 186 of plunger rod 172 to translate out of plunger opening 206. The translation of plunger rod 172 away from axis A-A' also compresses compression spring 180 between spring interference surface 182 and bushing 184.

Figure 7B:
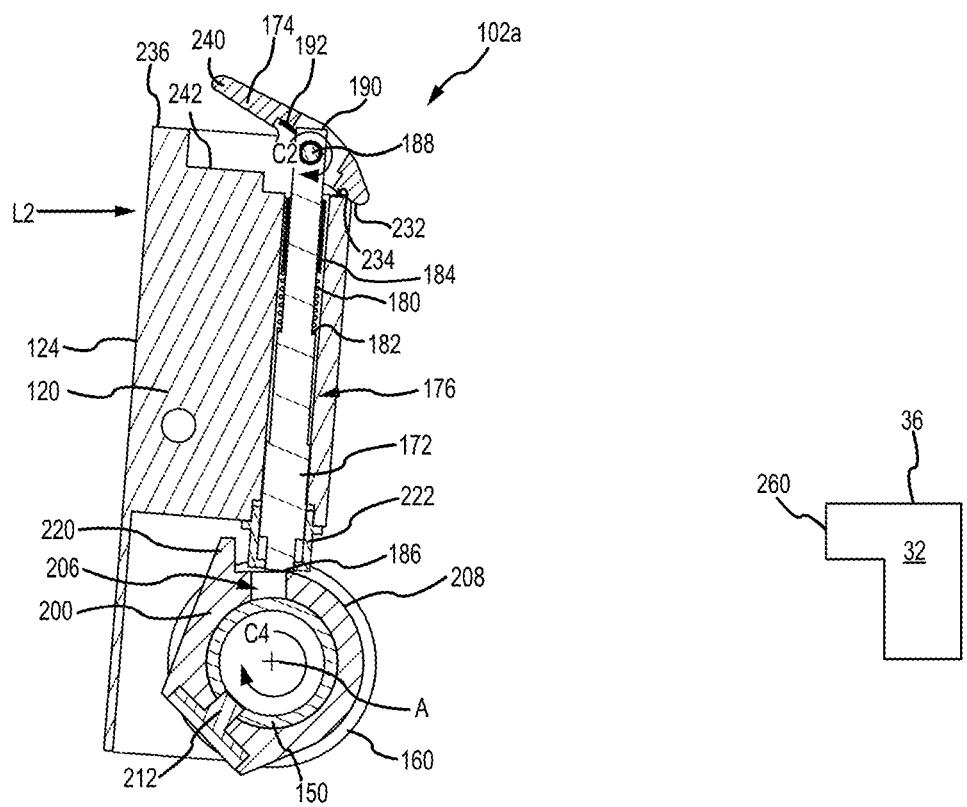

With reference to FIG. 7B, a cross-section view of first restraint 102, taken along line 6-6 in FIG. 5B, is illustrated, with plunger 170 in the disengaged state and first restraint 102 beginning to translate toward the stowed position. In response to first end 186 of plunger rod 172 being located outside of plunger opening 206, head 120 can rotate about shroud 200. Stated differently, locating first end 186 of plunger rod 172 radially outward of outer circumferential surface 208 removes the interference between shroud 200 and plunger rod 172, thereby allowing first end 186 of plunger rod 172 to translate circumferentially about axis A-A' and along the outer circumferential surface 208 of shroud 200. Shroud 200 does not rotate due to the contact between notch 212 and first outer tube 152. With plunger 170 in the disengaged state, head 120 can be rotated in a second circumferential direction about shroud 200, first outer tube 152, and axis A-A' (e.g., toward the stowed position) in response to a load L3 greater than the biasing force of head torsion spring 160 being applied to head 120.

As head 120 is rotated in the second circumferential direction, outer circumferential surface 208 blocks first end 186 of plunger rod 172 from translating radially inward (i.e., toward axis A-A'), thereby maintaining the distance between pin 188 and first lever interference surface 234 of head 120 and between second end 190 of plunger rod 172 and first lever interference surface 234. The increased distance from first lever interference surface 234, along with the biasing force applied by plunger torsion spring 192, forces plunger lever 174 to rotate in the first circumferential direction about pin 188. Plunger lever 174 may rotate until first lever surface 232 contacts head 120 (e.g., until plunger lever 174 contacts first lever interference surface 234). In the disengaged state, first end 240 of plunger lever 174 may be located above upper surface 236 of head 120. Stated differently, a distance between first end 240 of plunger lever 174 and axis A-A' may be greater than the distance between upper surface 236 of head 120 and axis A-A', when plunger 170 is in the disengaged state.

Figure 7C:
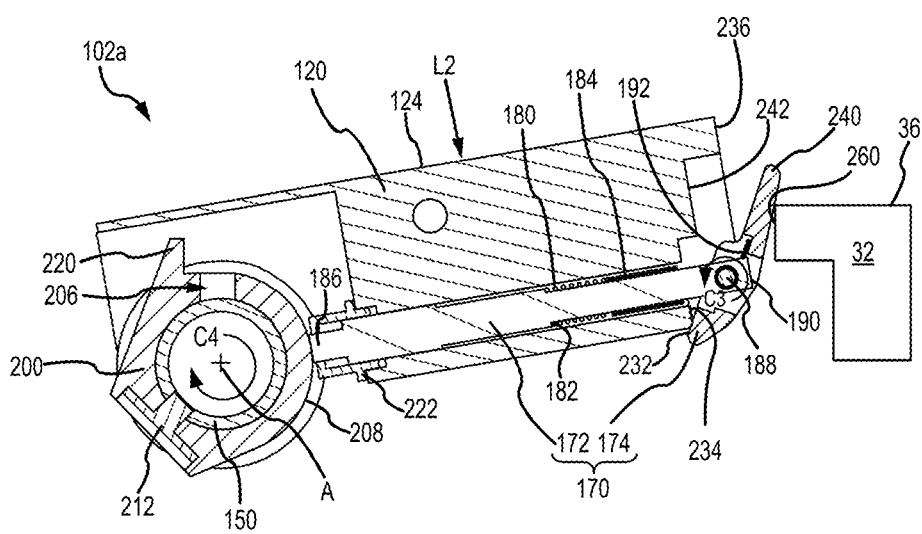
Figure 7D:
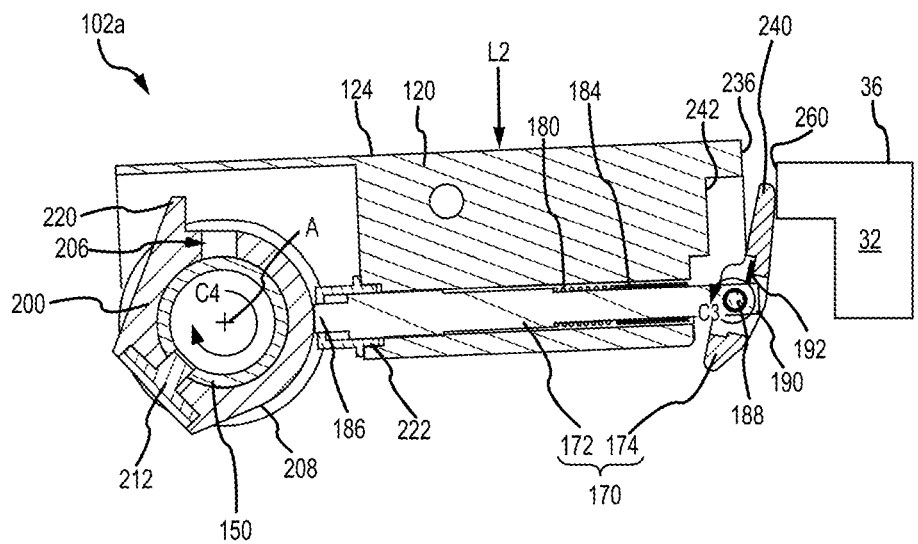

With reference to FIGS. 7C and 7D, as head 120 is rotated toward panel 32, contact is generated between a vertical surface 260 of panel 32 and plunger lever 174. Vertical surface 260 may be approximately perpendicular to upper surface 36 of panel 32 (FIG. 5B). As used in the previous context only, "approximately" means±15° from perpendicular. The contact between vertical surface 260 and plunger lever 174 overcomes the biasing force applied by plunger torsion spring 192, thereby forcing plunger lever 174 to rotate about pin 188 in the second circumferential direction about 188 (i.e., in a direction opposite the direction of the biasing load applied by plunger torsion spring 192). Stated differently, the contact between vertical surface 260 and plunger lever 174 translates first end 240 of plunger lever 174 toward second lever interference surface 242, thereby decreasing the distance between first end 240 of plunger lever 174 and axis A-A'.

Figure 7E:
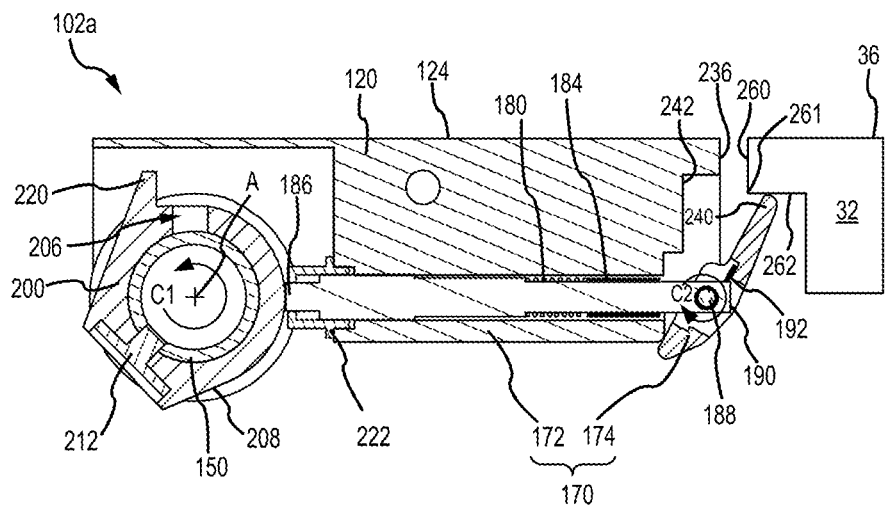

With reference to FIG. 7E, a cross-section view of first restraint 102, taken along line 6-6 in FIG. 5B, is illustrated, with plunger 170 in the disengaged state and first restraint 102 in the stowed position. In response to first end 240 of plunger lever 174 translating past the edge of vertical surface 260, plunger torsion spring 192 forces plunger lever 174 toward rotate in the first circumferential direction about pin 188, thereby forcing first end 240 to translate past (e.g., above) upper surface 236 of head 120. Load L3 (FIG. 7D) may be removed from, and/or no longer applied to, head 120 in response to first end 240 of plunger lever 174 translating past the edge of vertical surface 260. In response to the load L3 being removed from head 120, head torsion spring 192 may bias head 120 in the first circumferential direction about axis A-A'. The biasing force of head torsion spring 160 forces first end 240 of plunger lever 274 toward a lower surface 262 of panel 32. Lower surface 262 of panel is oriented away from upper surface 36 of panel. The contact between first end 240 of plunger lever 174 and lower surface 262 of panel 32 maintains head 120 in the stowed position. Stated differently, the interference between plunger lever 174 and lower surface 262 prevents first restraint 102 from translating to the raised position.

Figure 8:
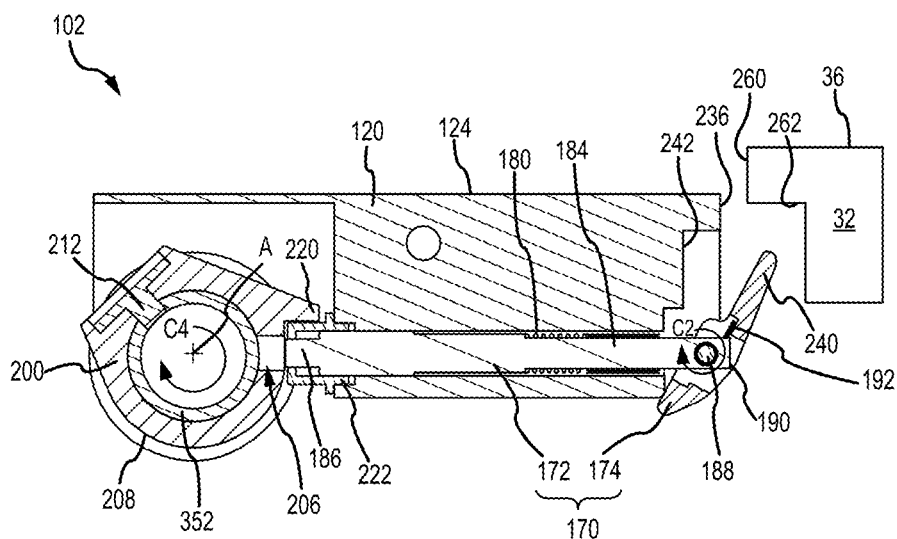
FIG. 8 illustrates a cross-section view of the second restraint of the restraint assembly actuation system for use with the cargo restraint system of FIG. 2 taken along the line 6-6 in FIG. 5B.

With reference to FIGS. 8, a cross-section view of second restraint 102b, taken along line 6-6 in FIG. 5B, is illustrated, with the plunger in the disengaged state and prior to second restraint 102b being translated from the stowed state toward the raised state. second restraint 102b is substantially similar to first restraint 102a, though second restraint 102b is actuated by second outer tube 352. In accordance with various embodiments, to translate second restraint 102b from the stowed position to the raised position, plunger 170 is translated to the engaged position, thereby rotationally coupling head 120 to shroud 200 and first outer tube 152. In this regard, second outer tube 352 is rotated about axis A-A', thereby causing shroud 200 to rotate about axis A-A'. The rotation of shroud 200 brings protrusion 220 of shroud 200 into contact with drive cap 222. Protrusion 220 and drive cap 222 are configured such that plunger opening 206 is radially aligned with the first end 186 of plunger rod 172 when protrusion 220 contacts drive cap 222, however, the frictional force between lower surface 262 and plunger lever 174 be prevent plunger rod 172 from translating into plunger opening 206. In this regard, the contact between protrusion 220 and drive cap 222 may force head 120 to rotate in the second circumferential direction about axis A-A' (i.e., away from the raised position and in the direction opposite the direction of the biasing load applied by head torsion spring 160). The rotation of head 120 in the second circumferential direction about axis A-A' forces first end 240 of plunger lever 174 away from lower surface 262 of panel 32.

With additional reference to FIG. 12, inner shaft 154 drives rotation of second outer tube 352. In that regard, inner shaft actuator assembly 976 may be used to rotate inner shaft 154 to cause actuation of second restrain 102b.

Figure 9:
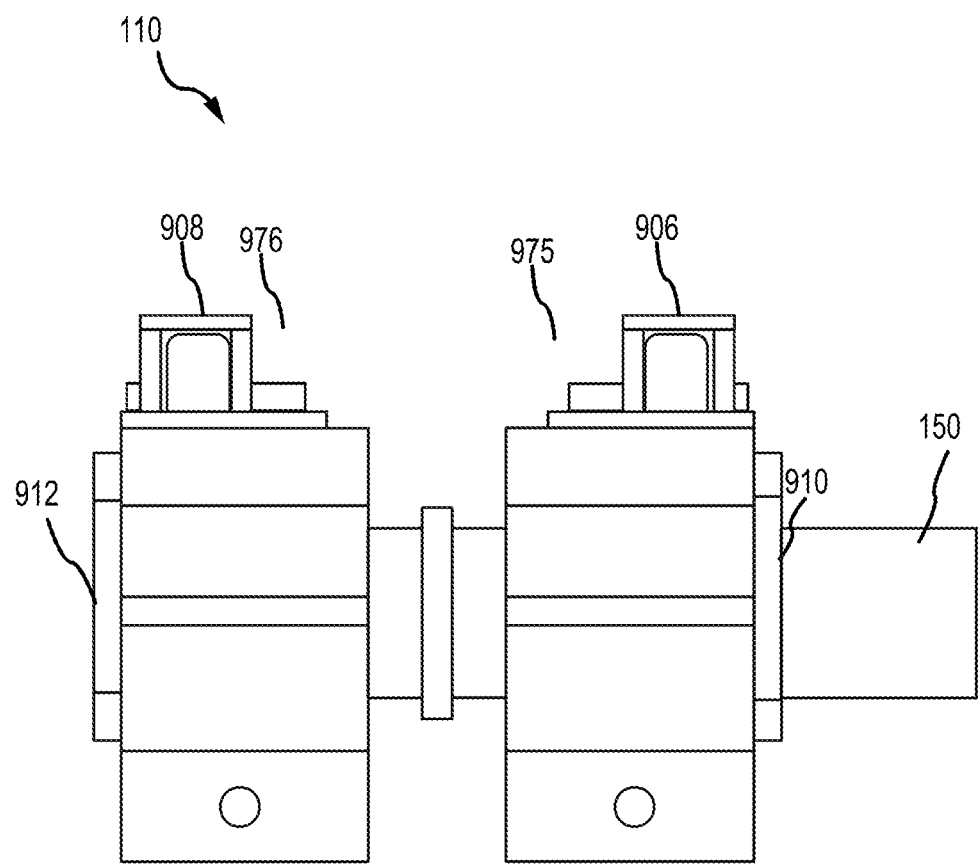
FIG. 9 illustrates a coaxial actuator assembly, in accordance with various embodiments.

With reference to FIG. 9, coaxial actuator assembly 110 is illustrated, in accordance with various embodiments is illustrated. Coaxial actuator assembly 110 may couple with drive shaft assembly 150, wherein the first outer tube 152 and the inner shaft 154 are disposed coaxially about the A-A' axis. Coaxial actuator assembly 110 comprises inner shaft actuator assembly 976 and first outer tube actuator assembly 975. First outer tube actuator assembly 975 includes a first spring loaded plunger lever 906. Additionally, coaxial actuator assembly 110 includes inner shaft actuator assembly 976 coupled to the drive shaft assembly 150. Second spring loaded plunger lever 908 may be coupled to the inner shaft actuator assembly 976.

First outer tube actuator assembly 975 further includes a first geometric gripping surface 910. Inner shaft actuator assembly 976 includes a second geometric gripping surface 912. A tool may be used to grip on and rotate the first geometric gripping surface 910 or the second geometric gripping surface 912. The tool may be a wrench, channel lock pliers, pliers or any other suitable tool which can grip on to a geometric surface and impart rotation around the axis. The tool may also be a motorized system, such as an electromechanical actuator and/or electric motor such as a brushless DC motor, which may receive a command to rotate the first geometric gripping surface 910 or second geometric gripping surface 912 in response to a rotational command by a controller. The rotational command may be transmitted by the controller to the motorized system in response to a switch being activated.

Figure 10:
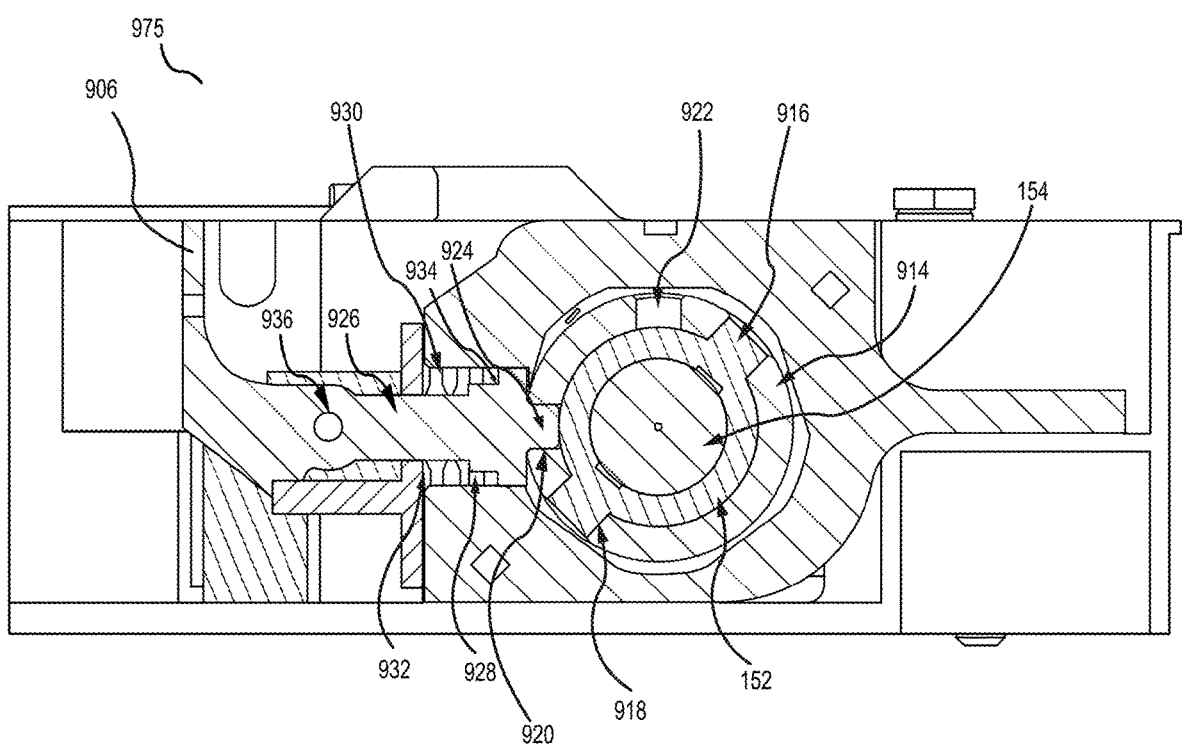
FIG. 10 illustrates a cross-section view of a first outer tube actuator assembly of the coaxial actuator assembly in FIG. 9.

With reference to FIG. 9 and FIG. 10, a cross-section view of first outer tube actuator assembly 975 of the coaxial actuator assembly 110 in FIG. 9 is illustrated. The first outer tube actuator assembly 975 may comprise a first actuator tube 914 disposed within the first outer tube actuator assembly 975. The first actuator tube 914 is coupled to the first outer tube 152 at a first notch 916 and a second notch 918. The first notch 916 and the second notch 918 may be extensions of the first outer tube 152 which are configured to rotate the first outer tube 152 in response to rotation of the first actuator tube 914. The first notch 916 and the second notch 918 may be disposed on opposite sides of the first outer tube 152. Rotation of the first actuator tube 914 about axis A-A' causes first outer tube 152 to rotate in the same direction about axis A-A' as first actuator tube 914 due to the contact between first notch 916 and first actuator tube 914 and the contact between second notch 918 and first actuator tube 914.

A first spring loaded plunger 924 is disposed within the first outer tube actuator assembly 975, and the first spring loaded plunger 924 includes a first spring loaded plunger rod 926 and the first spring loaded plunger lever 906. First spring loaded plunger rod 926 is configured to translate radially (i.e., perpendicular to axis A-A'). In this regard, first spring loaded plunger rod 926 translates toward and away from first outer tube 152. In various embodiments, first spring loaded plunger rod 926 may be located in a first spring loaded plunger channel 928. A compression spring 930 may be located about first spring loaded plunger rod 926. Compression spring 930 may be compressed between a first spring interference surface 932 and a second spring interference 934 formed by the first spring loaded plunger rod 926. Compression spring 930 biases a first end of plunger rod in the radially inward direction (i.e., toward first outer tube 152 and axis A-A). Compression spring 930 comprises any suitable spring, such as a coil spring, leaf spring, Belleville spring, or the like A first actuator lever pin 936 may be located through first spring loaded plunger rod 926 and first spring loaded plunger lever 906. First actuator lever pin 936 may be located proximate a second end of first spring loaded plunger rod 926. The second end of first spring loaded plunger rod 926 is opposite the first end. First spring loaded plunger lever 906 may rotate about first actuator lever pin 936. A first plunger torsion spring may be located about first actuator lever pin 936 and may apply a biasing load to first spring loaded plunger lever 906. First plunger torsion spring may bias first spring loaded plunger lever 906 in the first circumferential direction about first actuator lever pin 936.

The first actuator tube 914 also comprises a first actuator tube opening 920 and a second actuator tube opening 922. The first spring loaded plunger 924 is configured to fit into the first actuator tube opening 920 and the second actuator tube opening 922. When the first spring loaded plunger 924 is in the first actuator tube opening 920 or the second actuator tube opening 922, then the first actuator tube 914 and the first outer tube 152 are prevented from rotating about the A-A' axis. In response to a force exerted on the first spring loaded plunger lever 906 in the direction towards the drive shaft assembly 150, the first spring loaded plunger rod 926 translates in the direction opposite the first outer tube 152 and perpendicular to the A-A' axis. This allows both the first actuator tube 914 and the first outer tube 152 to rotate about the A-A' axis. The first outer tube 152 and the first actuator tube 914 coaxially rotate about the A-A' axis in response to the first spring loaded plunger lever 906 translating the first spring loaded plunger 924 out of the first actuator tube opening 920 or the second actuator tube opening 922, and in response to the first geometric gripping surface 910 driving rotation of the first outer tube 152.

Figure 11:
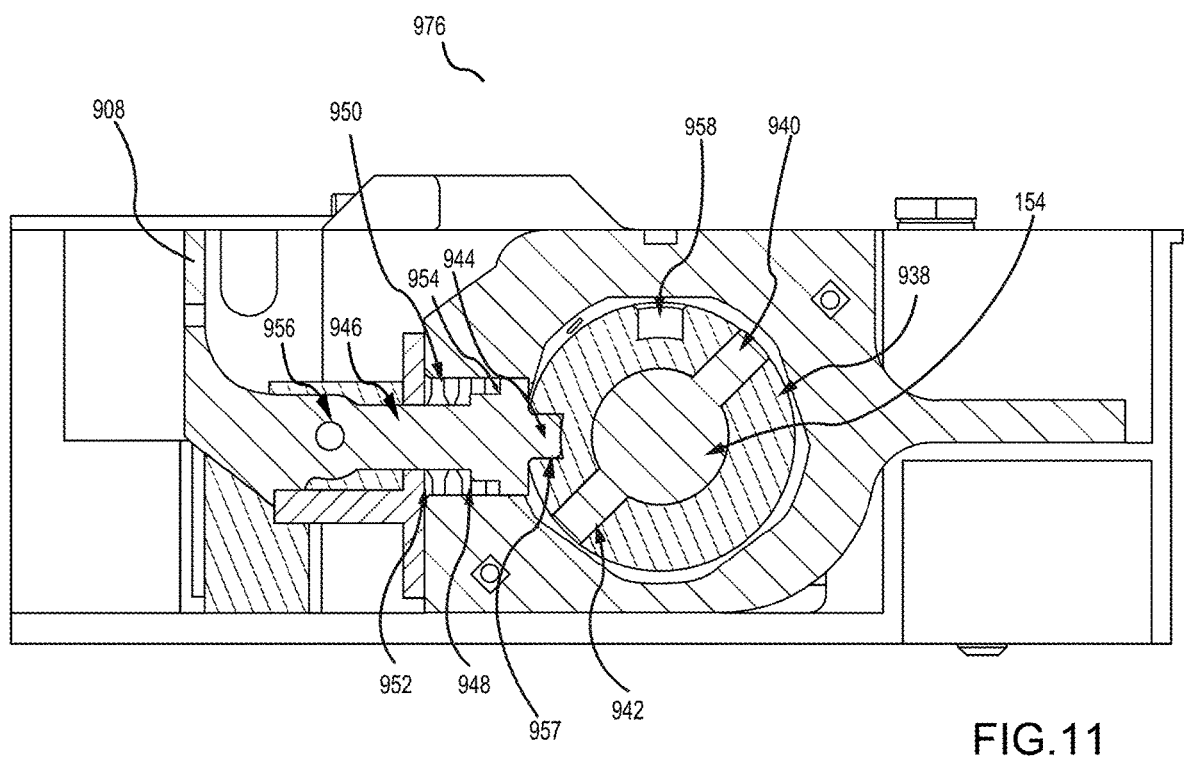
FIG. 11 illustrates a cross-section view of an inner shaft actuator assembly of the coaxial actuator assembly in FIG. 9.

With reference to FIG. 9 and FIG. 11, a cross-section view of the comprises inner shaft actuator assembly 976 of the coaxial actuator assembly 110 in FIG. 9 is illustrated. The inner shaft actuator assembly 976 comprises a second actuator tube 938. Second actuator tube 938 is coupled to the inner shaft 154 at a first notch 940 and a second notch 942. The first notch 940 and the second notch 942 may be extensions of the inner shaft 154 which are configured to rotate the inner shaft 154 in response to rotation of the second actuator tube 938. The first notch 940 and the second notch 942 may be disposed on opposite sides of the inner shaft 154. Rotation of the second actuator tube 938 about axis A-A' causes inner shaft 154 to rotate in the same direction about axis A-A' second actuator tube 938 due to the contact between first notch 940 and second actuator tube 938 and the contact between second notch 942 and second actuator tube 938.

A first spring loaded plunger 944 is disposed within inner shaft actuator assembly 976, and the first spring loaded plunger 944 includes a second spring loaded plunger rod 946 and the second spring loaded plunger lever 908. Second spring loaded plunger rod 946 is configured to translate radially (i.e., perpendicular to axis A-A'). In this regard, second spring loaded plunger rod 946 translates toward and away from inner shaft 154. In various embodiments, second spring loaded plunger rod 946 may be located in a second spring loaded plunger channel 948. Compression spring 950 may be located about second spring loaded plunger rod 946. Compression spring 950 may be compressed between first spring interference surface 952 and a second spring interference 954 formed by the second spring loaded plunger rod 946. Compression spring 950 biases a first end of second spring loaded plunger rod 946 in the radially inward direction (i.e., toward inner shaft 154 and axis A-A). Compression spring 950 comprises any suitable spring, such as a coil spring, leaf spring, Belleville spring, or the like A first actuator lever pin 956 may be located through second spring loaded plunger rod 946 and second spring loaded plunger lever 908. First actuator lever pin 956 may be located proximate a second end of second spring loaded plunger rod 946. The second end of second spring loaded plunger rod 946 is opposite the first end. Second spring loaded plunger lever 908 may rotate about first actuator lever pin 956. A first plunger torsion spring may be located about first actuator lever pin 956 and may apply a biasing load to second spring loaded plunger lever 908. First plunger torsion spring may bias first spring loaded plunger lever 906 second spring loaded plunger lever 908 in the first circumferential direction about first actuator lever pin 956.

Second actuator tube 938 also comprises a first actuator tube opening 957 and a second actuator tube opening 958. The spring loaded plunger 944 is configured to fit into the first actuator tube opening 957 and the second actuator tube opening 958. When the spring loaded plunger 944 is in the first actuator tube opening 957 or the second actuator tube opening 958, then the second actuator tube 938 and the inner shaft 154 are prevented from rotating about the A-A' axis. In response to a force exerted in the direction towards the drive shaft assembly 150 to the second spring loaded plunger lever 908, then the second spring loaded plunger rod 946 translates in the direction opposite the inner shaft 154 and perpendicular to the A-A' axis and allows both the first actuator tube 914 and the first outer tube 152 to rotate about the A-A' axis. The inner shaft 154 and the second actuator tube 938 rotate about the A-A' axis in response to the second spring loaded plunger lever 908 translating the second spring loaded plunger rod 946 out the first actuator tube opening 957 or the second actuator tube opening 958, and in response to the second geometric gripping surface 912 driving rotation of the inner shaft 154.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A restraint assembly actuation system for use with a cargo restraint system, comprising:
    a drive shaft assembly comprising a first outer tube and an inner shaft, wherein the first outer tube and the inner shaft are disposed coaxially about an axis; and
    a first restraint coupled to the first outer tube and comprising:
        a head configured to engage with the cargo load,
        a shroud coupled to the outside of the first outer tube, and
        a plunger rod coupled to the shroud and the head,
    wherein the first outer tube is configured to rotate the first restraint about the axis to a raised position to restrain a cargo load.

2. The restraint assembly actuation system of claim 1, wherein the shroud comprises a notch opening configured to receive a notch coupled to the inner shaft and the shroud at a first opening of the first outer tube.

3. The restraint assembly actuation system of claim 2, the first restraint further comprising:
    the head defining a plunger channel;
    a plunger including the plunger rod and a plunger lever, the plunger rod being located, at least, partially in the plunger channel;
    a plunger torsion spring configured to apply a first biasing load to the plunger lever; and
    a compression spring configured to bias a first end of the plunger away from an upper surface of the head.

4. The restraint assembly actuation system of claim 3, further comprising a drive cap located around the first end of the plunger rod.

5. The restraint assembly actuation system of claim 4, wherein the shroud defines a plunger opening configured to receive the first end of the plunger rod.

6. The restraint assembly actuation system of claim 5, wherein the shroud includes a protrusion extending radially outward from an outer circumferential surface of the shroud.

7. The restraint assembly actuation system of claim 1, further comprising a second outer tube coupled to the inner shaft and configured to rotate with the inner shaft.

8. The restraint assembly actuation system of claim 7, further comprising a second restraint coupled to the second outer tube, wherein the second outer tube is configured to rotate the second restraint about the axis to a raised position to restrain the cargo load.

9. The restraint assembly actuation system of claim 8, wherein the second outer tube is located aft of the first outer tube.

10. A coaxial actuator assembly, comprising:
   a drive shaft assembly comprising a first outer tube and an inner shaft, wherein the first outer tube and the inner shaft are disposed coaxially about an axis;
   a first outer tube actuator assembly coupled to the drive shaft assembly;
   a first actuator tube disposed within the first outer tube actuator assembly and coupled to the first outer tube, wherein the first actuator tube comprises a first actuator opening and a second actuator opening, each disposed in the first actuator tube;
   a first spring loaded plunger configured to be disposed in at least one of the first actuator opening or the second actuator opening; and
   a first actuator lever coupled to the first spring loaded plunger, the first actuator lever configured to translate the first spring loaded plunger at least one of in and out the first actuator opening and the second actuator opening; and
   a first geometric gripping surface coupled to the first outer tube actuator assembly configured to drive rotation of the first outer tube.

11. The coaxial actuator assembly of claim 10, wherein the first outer tube rotates coaxially about the axis in response to the first geometric gripping surface driving rotation of the first outer tube.

12. The coaxial actuator assembly of claim 11, further comprising an inner shaft actuator assembly coupled to the drive shaft assembly;
   a second actuator tube disposed within the inner shaft actuator assembly and coupled to the inner shaft, wherein the second actuator tube comprises a first actuator opening and a second actuator opening each disposed in the second actuator tube;
   a second spring loaded plunger configured to be disposed in the first actuator opening or the second actuator opening; and
   a second actuator lever coupled to the second plunger, configured to translate the second plunger at least one of in and out the first actuator opening and the second actuator opening; and
   a second geometric gripping surface coupled to the inner shaft actuator assembly and configured to drive rotation of the inner shaft.

13. The coaxial actuator assembly of claim 12, wherein the inner shaft rotates in response to the second geometric gripping surface driving rotation of the inner shaft.

14. A restraint assembly actuation system, comprising:
   a drive shaft assembly comprising a first outer tube and an inner shaft, wherein the first outer tube and the inner shaft are disposed coaxially about an axis;
   a coaxial actuator assembly comprising:
      a first outer tube actuator assembly coupled to the drive shaft assembly, a first actuator tube disposed within the first outer tube actuator assembly and coupled to the first outer tube, wherein the first actuator tube comprises a first actuator opening and a second actuator opening each disposed in the first actuator tube,
      a first spring loaded plunger configured to be disposed in at least one of the first actuator opening or the second actuator opening,
      a first actuator lever coupled to the first spring loaded plunger, configured to translate the first spring loaded plunger at least one of in and out the first actuator opening and the second actuator opening, and
      a first geometric gripping surface coupled to the first outer tube actuator assembly and configured to drive rotation of the first outer tube;
   a second outer tube coupled to the inner shaft; and
   a first restraint assembly actuation system comprising:
      a first restraint coupled to the first outer tube, wherein the first outer tube is configured to rotate the first restraint about the axis to a raised position to restrain a cargo load.

15. The restraint assembly actuation system of claim 14, further comprising a second restraint coupled to the second outer tube.

16. The restraint assembly actuation system of claim 15, wherein the second outer tube is configured to rotate the second restraint about the axis to the raised position to restrain the cargo load.

17. The restraint assembly actuation system of claim 16, further comprising an inner shaft actuator assembly coupled to the drive shaft assembly;
   a second actuator tube disposed within the inner shaft actuator assembly and coupled to the inner shaft, wherein the second actuator tube comprises a first actuator opening and a second actuator opening each disposed in the second actuator tube;
   a second spring loaded plunger configured to be disposed within at least one of the first actuator opening or the second actuator opening; and
   a second actuator lever coupled to the second plunger, configured to translate the second plunger at least one of in and out the first actuator opening and the second actuator opening; and
   a second geometric gripping surface coupled to the inner shaft actuator assembly configured to drive rotation of the inner shaft.

18. The restraint assembly actuation system of claim 17, further comprising:
   a plurality of forward restraints coupled to the first outer tube and configured to be actuated by the first outer tube, and
   a plurality of aft restraints coupled to the second outer tube and configured to rotate coaxially with the second outer tube.

* * * * *